(12) United States Patent
Owen

(10) Patent No.: US 10,221,979 B2
(45) Date of Patent: Mar. 5, 2019

(54) DETACHABLE TUBE COUPLING SYSTEM

(71) Applicant: Randel William Owen, Titusville, FL (US)

(72) Inventor: Randel William Owen, Titusville, FL (US)

( * ) Notice: Subject to any disclaimer, the term of this patent is extended or adjusted under 35 U.S.C. 154(b) by 839 days.

(21) Appl. No.: 14/857,105

(22) Filed: Sep. 17, 2015

(65) Prior Publication Data

US 2016/0084418 A1 Mar. 24, 2016

Related U.S. Application Data

(60) Provisional application No. 62/052,023, filed on Sep. 18, 2014.

(51) Int. Cl.
*F16L 37/14* (2006.01)

(52) U.S. Cl.
CPC .................................. *F16L 37/148* (2013.01)

(58) Field of Classification Search
CPC .......... F16L 37/148; F16L 37/04; F16L 41/02
See application file for complete search history.

(56) References Cited

U.S. PATENT DOCUMENTS

| | | | | |
|---|---|---|---|---|
| 5,816,625 | A * | 10/1998 | Clarke | F16L 37/148 285/305 |
| 2004/0046386 | A1* | 3/2004 | Chien | F16L 37/148 285/276 |
| 2013/0180610 | A1* | 7/2013 | McGowan | F16L 55/11 137/613 |
| 2013/0300103 | A1* | 11/2013 | Magargal | F16L 37/148 285/5 |
| 2016/0356411 | A1* | 12/2016 | Clapper | F16L 17/02 |

* cited by examiner

*Primary Examiner* — Daniel J Wiley
(74) *Attorney, Agent, or Firm* — Sandra Layer

(57) ABSTRACT

A Detachable Tube Coupling System comprised of a plurality of base and coupling modules formed with a mechanical interface which includes a locking line, an inner tube and having an exterior surface with a circumferential interior groove, an O-ring and an outer tube formed with a circumferential interior groove in the interior surface and an exterior notch formed in the outer tube in communication with the interior groove.

12 Claims, 7 Drawing Sheets

DETACHABLE TUBE COUPLING SYSTEM

RELATED APPLICATION

The present patent application claims priority to the corresponding provisional patent application Ser. No. 62/052,023, entitled "Detachable Tube Coupling System" filed on Sep. 18, 2014.

BACKGROUND OF THE INVENTION

Field of the Invention

The present invention relates to a Detachable Tube Coupling System and more particularly pertains to a series of base fittings mechanically interfaced to modular tube couplings and/or thread modules by engaging a locking line in a shared groove between the base and tube and/or thread modules.

Description of the Prior Art

The use of detachable couplings is known in the prior art. More specifically, detachable couplings previously devised and used for the purpose of removably attaching and sealing plastic, elastomeric or metal tubing are known to consist basically of familiar, expected, and obvious structural configurations, notwithstanding the myriad of designs encompassed by the crowded prior art which has been developed for the fulfillment of countless objectives and requirements. Tube Couplings exist in numerous formats: barbed, compression, flared, push-to-connect, quick-disconnect and glued. Tube fittings may additionally encompass an internal or external threaded component. These thread elements facilitate the joining of one fitting to another in order to configure a tube circuit. Tube fittings are fabricated in various configurations that include, but are not limited to straight, elbow, and tee. Tube fittings are constructed with fixed tube couplings and/or threaded components. The tube fitting construction methods include, but are not limited to machined, casted, molded, extruded or a combination of these methods. The fittings are currently produced with fixed configurations, tube coupling formats, threads and sizes. This rigid approach imposes many limitations on the manufacturer and end user. The manufacturer is able to offer a limited number of coupling configurations, threads and sizes. The incorporation of standard and metric configurations is uncommon and restricted. The end user often uses additional fittings and adapters to complete the tube circuitry.

By way of example, U.S. Pat. No. 4,712,810 issued Dec. 15, 1987 to Gin C. Pozzi discloses a Quick Action Self-Locking Pipe Fitting. U.S. Pat. No. 4,993,755 issued Feb. 19, 1991 to Robert L Johnson discloses a Quick Connect Fitting. U.S. Pat. No. 3,131,905 issued Mar. 5, 1964 to C. E. J. Nyberg discloses a Quick Release Coupling for Hoses and the Like. Lastly, U.S. Pat. No. 7,270,349 issued Sep. 18, 2007 to Bamberger, Heer, Pinardi and Portido discloses a Quick Release Coupling for Pipes.

While these devices fulfill their respective, particular objectives and requirements, the aforementioned do not describe Detachable Tube Coupling System having a detachable mechanical interface that seals and locks a series of coupling and base modules while providing a freely rotatable connection for easy installation or removal and facilitating a large number of configurations with a relatively limited number of interchangeable modules.

In this respect, the Detachable Tube Coupling System according to the present invention substantially departs from the conventional concepts and designs of the prior art, and in doing so provides an apparatus primarily developed for the purpose of detachably sealing and locking a series of coupling and base modules while providing a freely rotatable connection for easy installation or removal and facilitating a large number of configurations with a relatively limited number of interchangeable modules.

Therefore, it can be appreciated that there exists a continuing need for a new and improved Detachable Tube Coupling System which can be used for detachably sealing and locking a series of interchangeable coupling and base modules while providing a freely rotatable connection for easy installation or removal. In this regard, the present invention substantially fulfills this need.

SUMMARY OF THE INVENTION

In view of the foregoing disadvantages inherent in the known types of detachable coupling systems now present in the prior art, the present invention provides an improved Detachable Tube Coupling System. As such, the general purpose of the present invention, which will be described subsequently in greater detail, is to provide a new and improved Detachable Tube Coupling System and method which has all the advantages of the prior art and none of the disadvantages. The present invention provides for a series of standard configuration base modules mechanically interfaced to interchangeable tube coupling modules and/or thread modules. In one embodiment, a mechanical interface seals and locks the coupling modules to the base modules. The seal between the base and coupling is facilitated by an O-ring. The locking feature is accomplished with a shared, machined groove, half of which resides in the base module and half in the tube/thread module. A flexible plastic or metal line engages the combined groove to lock the modules into position. The design additionally facilitates the thread modules to swivel as required for installation or removal. The design approach enables a large number of tube fitting configurations with a relatively limited number of interchangeable modules.

To attain this, the present invention essentially comprises a locking line fabricated of an inextensible, flexible, plastic or metal material and having a fixed diameter along the entire length. A base fitting formed with at least one end forming an inner tube having an exterior surface with a cylindrical configuration, and an interior surface with a cylindrical configuration. The inner tube having a free inner end with an interior groove having an annular semi-cylindrical configuration formed in the exterior surface. The interior groove is located at a fixed axial length from the free end of the inner tube. A modular coupler having at least one end forming an outer tube having an exterior surface with a cylindrical configuration, an interior surface with a cylindrical configuration and a free outer end. An exterior groove having an annular semi-cylindrical configuration is formed in the interior surface of the outer tube adjacent to the free end of the outer tube. An exterior notch is formed in the outer tube in communication with the interior groove, whereby when the inner tube and the outer tube are axially positioned with the interior groove and exterior groove forming a channel, the channel has a diameter essentially equal to the diameter of the locking line. The locking line is in a locked orientation when the central section is positioned within the channel to abate axial movement between the inner and outer tubes, the free ends are exterior of the system for handling and the intermediate sections located between the free ends and the central section of the locking lines are within the outer notch. The locking line is adapted to be pulled from the channel through the outer notch to an unlocked orientation thereby facilitating separation of the inner and outer tubes.

In an alternate embodiment the outer tube is formed with an annular abutment shoulder projecting radially inwardly from the interior surface of the outer tube a fixed axial length from the free inner end of the inner tube. When in a locked position, the inner tube is located co-axially within the outer tube with the annular abutment shoulder of the outer ring in close proximity to the free inner end of the inner tube.

In another embodiment of the present invention, the outer tube is formed with a second exterior groove having an annular semi-cylindrical configuration formed in the interior surface of the outer tube adjacent to the annular abutment. An O-ring is positioned in the second exterior groove along the exterior surface of the inner tube to form a fluidic seal. The O-ring is fabricated of an elastomeric material.

In still another embodiment of the present invention, the locking line is further defined as having a cylindrical cross section to facilitate easy insertion and removal.

A feature of the invention is the forming of the exterior cylindrical surface of the modular coupler as having hexagonal surface for receiving a wrench.

Another feature of the invention includes chamfering the leading edge of the free end of the inner tube of the base fitting in order to prevent cutting of the O-ring.

Still another feature of the invention is the flexibility provided by the multitude of base fittings which include but are not limited to straight fittings, elbow fittings, tee fittings and cross fitting.

Still another feature of the invention is the flexibility provided by the multitude of couplers which include but are not limited to tube couplers and threaded fittings.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved Detachable Tube Coupling System which has all of the advantages of the prior art detachable couplings and none of the disadvantages.

It is another object of the present invention to provide a new and improved Detachable Tube Coupling System which may be easily and efficiently manufactured and marketed.

It is further object of the present invention to provide a new and improved Detachable Tube Coupling System which is of durable and reliable constructions.

An even further object of the present invention is to provide a new and improved Detachable Tube Coupling System which is susceptible of a low cost of manufacture with regard to both materials and labor, and which accordingly is then susceptible of low prices of sale to the consuming public, thereby making such Detachable Tube Coupling System economically available to the buying public.

Even still another object of the present invention is to provide a Detachable Tube Coupling System suitable for a multitude of applications by utilizing base fittings and modular connectors of various sizes and configurations.

Lastly, it is an object of the present invention to provide a new and improved detachable tube coupling system primarily developed for the purpose of detachably sealing and locking a series of coupling and base modules while providing a freely rotatable connection for easy installation or removal and facilitating a large number of configurations with a relatively limited number of interchangeable modules.

These together with other objects of the invention, along with the various features of novelty which characterize the invention, are pointed out with particularity in the claims annexed to and forming a part of this disclosure.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description of a particularly preferred embodiment. Such description makes reference to the annexed drawings wherein.

The same reference numerals refer to the same parts throughout the various Figures.

DESCRIPTION OF THE PREFERRED EMBODIMENT

Figure 1:
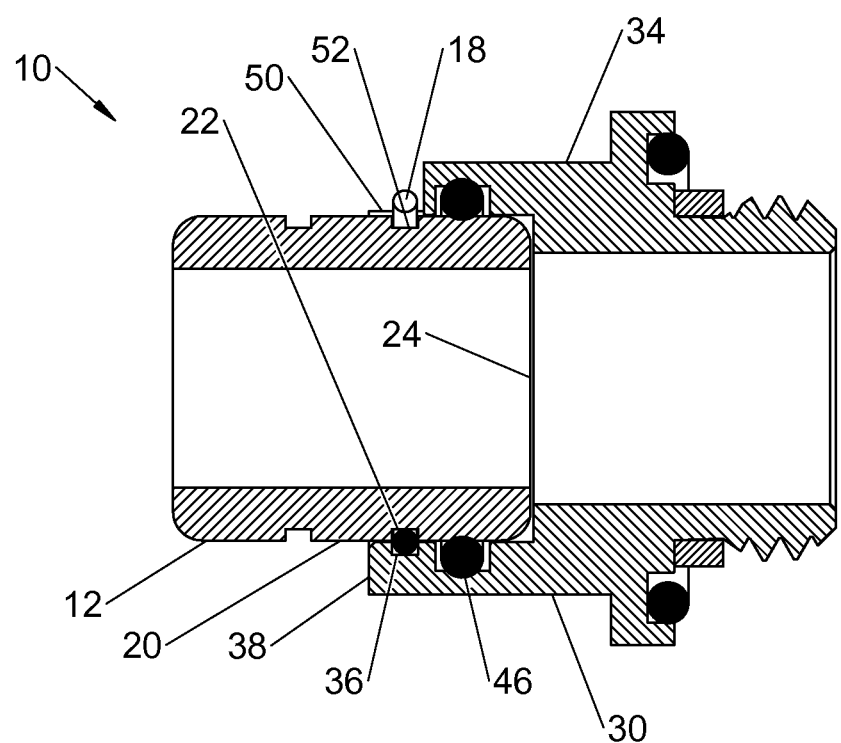
FIG. 1 is a cross-sectional view of a detachable tube coupling system construction in accordance with the principals of the present invention.
Figure 2:
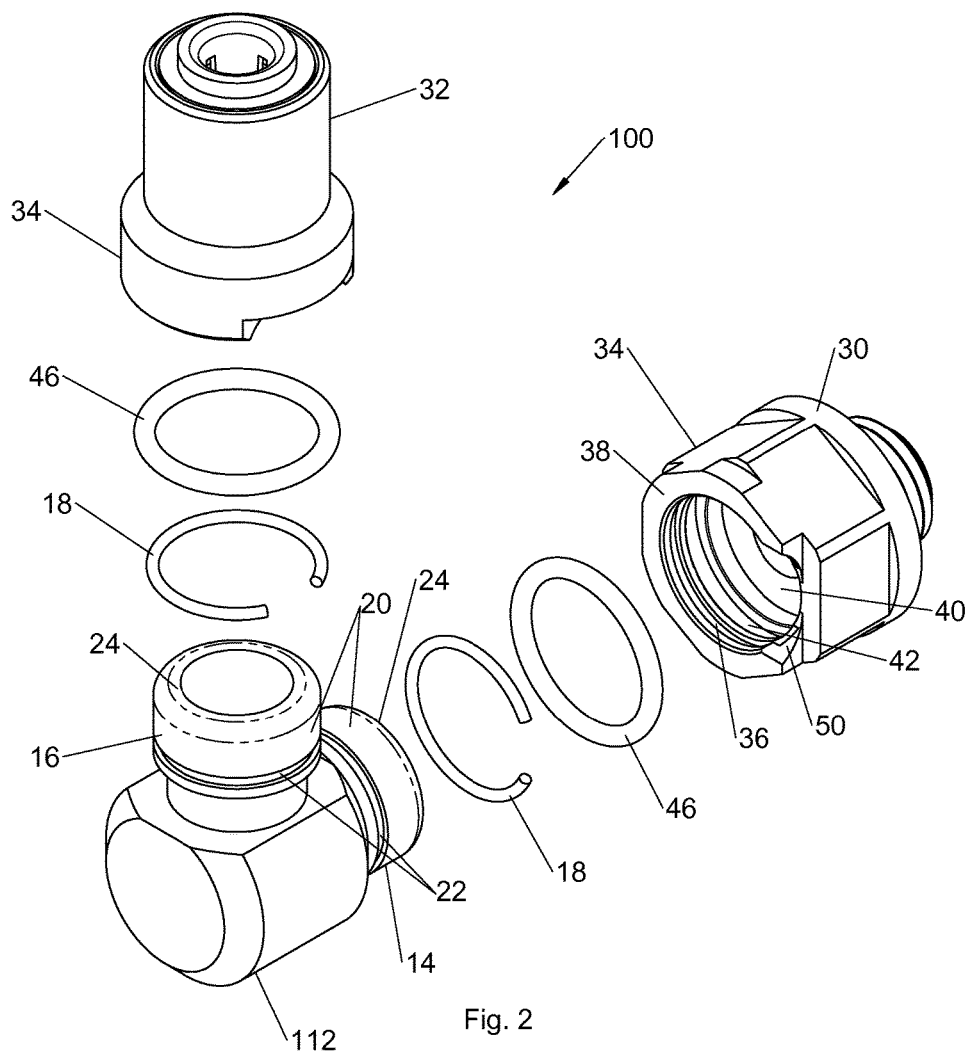
FIG. 2 is an exploded view of a detachable tube coupling system constructed in accordance with the principles of the present invention having a base fitting configured as an elbow.
Figure 3:
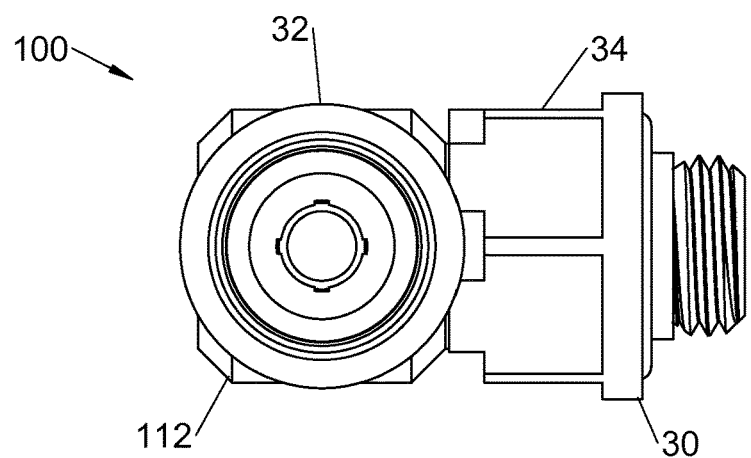
FIG. 3 is a top view of a Detachable Tube Coupling System constructed in accordance with the principles of the present invention having a base fitting configured as an elbow.
Figure 4:
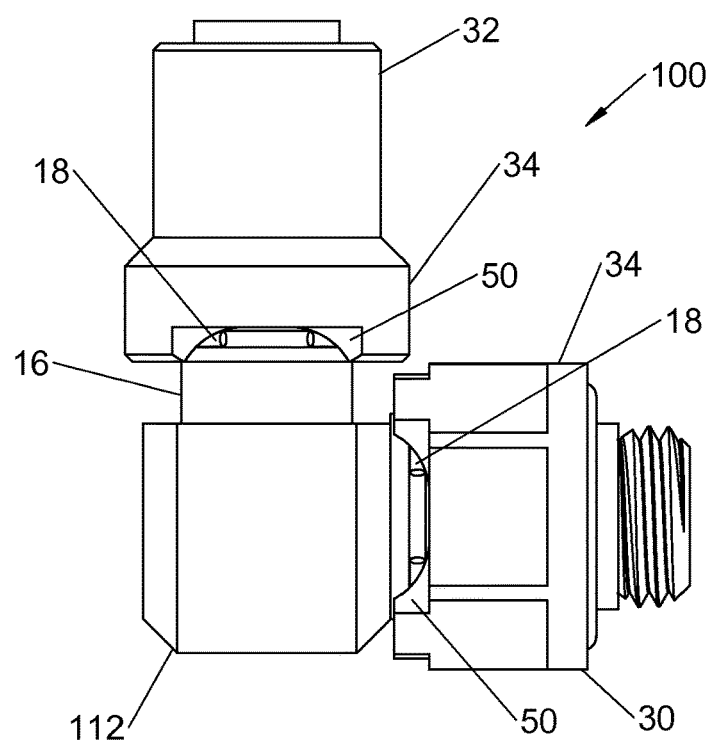
FIG. 4 is a side view of a Detachable Tube Coupling System constructed in accordance with the principles of the present invention having a base fitting configured as an elbow.
Figure 5:
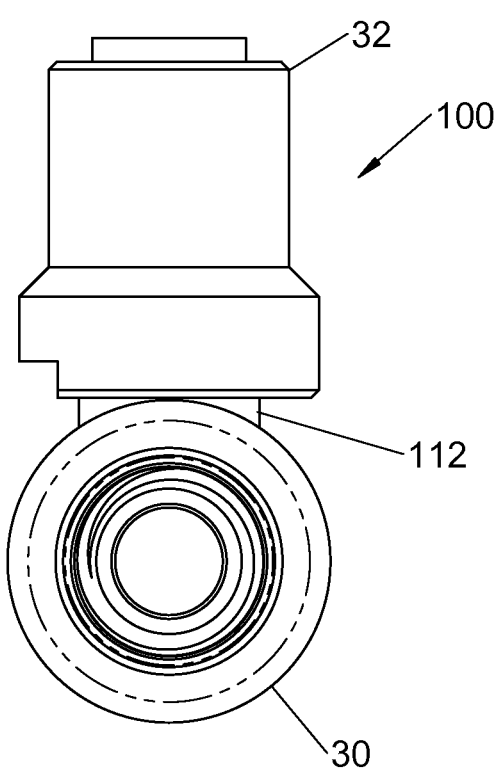
FIG. 5 is an end view of a Detachable Tube Coupling System constructed in accordance with the principles of the present invention having a base fitting configured as an elbow.
Figure 6:
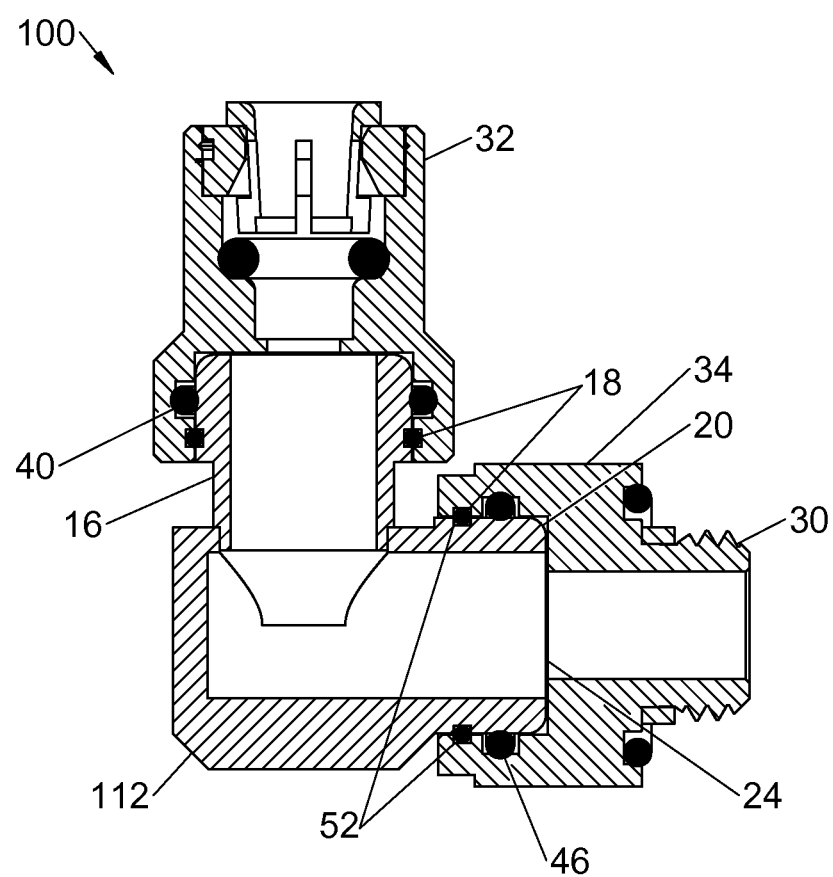
FIG. 6 is a cross sectional view of a Detachable Tube Coupling System constructed in accordance with the principals of the present invention having a base fitting configured as an elbow.

With reference now to the drawings, and in particular to FIG. 1 thereof, a particularly preferred embodiment of the new and improved Detachable Tube Coupling System embodying the principles and concepts of the present invention and generally designated by the reference numeral 10 will be described.

The present invention, the Detachable Tube Coupling System 10 is comprised of a plurality of components. Such components in their broadest context include a plurality of base and coupling modules formed with a mechanical interface which includes a locking line, an inner tube having an exterior surface with a circumferential interior groove, an O-ring and an outer tube formed with a circumferential exterior groove in the interior surface and an exterior notch formed in the outer tube in communication with the exterior groove.

In this broad context, first provided is a detachable tube coupling system 10 comprised of a locking line 18 fabricated of an inextensible, flexible, plastic or metal material with a fixed diameter along its entire length. A base fitting 12 is provided with at least one end forming an inner tube 20 in a cylindrical configuration. An annular interior groove 22 is formed in the exterior surface of the inner tube a fixed axial length from the free end 24 of the inner tube 20. A coupler 30 is provided with at least one end forming an outer tube 34 in a cylindrical configuration. An exterior groove 36 is formed in the interior surface having an annular configuration and located adjacent to the free end 38 of the outer tube. An O-ring 46 is positioned to form a fluidic seal between the inner and outer tubes. An exterior notch 50 is formed in the outer tube in communication with the interior groove. To lock and seal the connection, the inner tube is axially positioned within the outer tube whereby the interior groove and the exterior groove form a channel 52 with a diameter essentially equal to the diameter of the locking line. The locking line 18 is threaded into the channel through the notch and positioned with the free ends exterior of the system for handling. The locking line 18 is adapted to be pulled from the channel through the outer notch to an unlocked orientation thereby facilitating separation of the inner and outer tubes. Such components are individually configured and correlated with respect to each other so as to attain the desired objective.

In a particularly preferred embodiment of the Detachable Tube Coupling System, designated by reference numeral 100, and in reference to FIGS. 2 through 6, first provided is a locking line 18 fabricated of an inextensible, flexible, plastic or metal material with a cylindrical cross section and a fixed diameter along its entire length. A base fitting 112 is provided, comprised of an elbow fitting having a first end 14 and a second end 16. The first end is formed as an inner tube 20 having an exterior surface in a cylindrical configuration and an interior surface in a cylindrical configuration. A groove 22 is formed in the exterior surface having an annular semi-rectangular configuration a fixed axial length from the free end 24 of the inner tube. The second end is formed as an inner tube 20 having an exterior surface in a cylindrical configuration and an interior surface in a cylindrical configuration. A groove 22 is formed in the exterior surface having an annular semi-rectangular configuration a fixed axial length from the free end 24 of the inner tube.

A first modular coupler 30 is provided having at least one end forming an outer tube 34 with an exterior in a cylindrical configuration, and an interior surface in a cylindrical configuration. An exterior groove 36 is formed in the interior surface having an annular semi-rectangular configuration and located adjacent to the free end 38 of the outer tube. An annular abutment shoulder 40 projects radially inward from the interior surface of the outer tube. A second groove 42 having an annular configuration is formed in the interior surface of the outer tube adjacent to the annular abutment. An O-ring 46 fabricated of an elastomeric material is positioned in the second groove to form a fluidic seal between the inner tube of the first end 14 and outer tube of the first coupler. An exterior notch 50 is formed in the outer tube in communication with the interior groove. The exterior notch extends circumferentially for up to 100 degrees at the interiorsurface of the outer tube and for up to 120 degrees at the exterior surface of the outer tube. The first modular coupler has a second end formed as a threaded connector. To lock and seal the connection, the inner tube 20 is axially positioned within the outer tube 34 whereby the interior groove 22 of the inner tube of the first end and the and exterior groove 36 of the outer tube of the first coupler form a channel 52 with a diameter essentially equal to the diameter of the locking line. The locking line 18 is threaded into the channel through the notch and positioned with the free ends exterior of the system for handling. The locking line is adapted to be pulled from the channel 52 through the outer notch 50 to an unlocked orientation thereby facilitating separation of the inner and outer tubes.

A second modular coupler 32 is provided having at least one end forming an outer tube 34 with an exterior in a cylindrical configuration, and an interior surface in a cylindrical configuration. An exterior groove 36 is formed in the interior surface having an annular semi-rectangular configuration and located adjacent to the free end 38 of the outer tube. An annular abutment shoulder 40 projects radially inward from the interior surface of the outer tube. A second groove 42 having an annular configuration is formed in the interior surface of the outer tube adjacent to the annular abutment. An O-ring 46 fabricated of an elastomeric material is positioned in the second groove to form a fluidic seal between the inner tube of the second end 16 and outer tube of the second coupler. An exterior notch 50 is formed in the outer tube in communication with the exterior groove 36. The exterior notch extends circumferentially for up to 100 degrees at the interior surface of the outer tube and for up to 120 degrees at the exterior surface of the outer tube. The second modular coupler has a second end formed as a tube connector. To lock and seal the connection, the inner tube 20 of the second free end is axially positioned within the outer tube 34 of the second coupler whereby the interior groove 22 of the inner tube of the second end and the and exterior groove 36 of the outer tube of the second coupler form a channel 52 with a diameter essentially equal to the diameter of the locking line. The locking line 18 is threaded into the channel through the notch and positioned with the free ends exterior of the system for handling. The locking line is adapted to be pulled from the channel 52 through the outer notch 50 to an unlocked orientation thereby facilitating separation of the inner and outer tubes.

Figure 7:
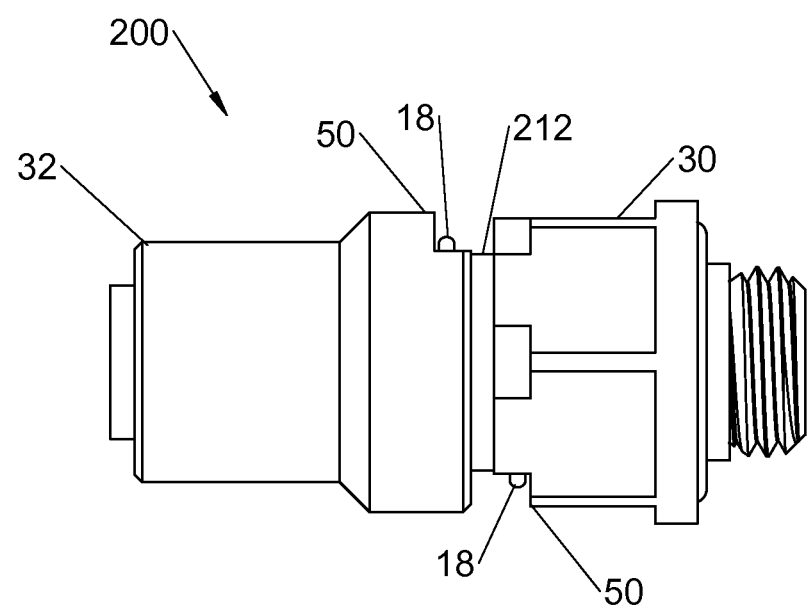
FIG. 7 is a side view of an alternate embodiment of a Detachable Tube Coupling System constructed in accordance with the principles of the present invention having a base fitting configured as a straight fitting.

In reference to FIG. 7, an alternate embodiment 200 is shown which includes a base fitting 212 configured as a straight connector. The base fitting having two free ends, each end forming an inner tube in a cylindrical configuration with annular grooves formed in the exterior surface of each of the inner tubes a fixed axial length from the free end. Two modular couplers are shown 30, 32 each having a free end having at least one end forming an outer tube 34 with an exterior in a cylindrical configuration, and an interior surface in a cylindrical configuration. A groove 36 is formed in the interior surface of each coupler having an annular semi-rectangular configuration and located adjacent to the free end of the outer tube. An exterior notch 50 is formed in the outer tube of each of the couplers in communication with the interior groove of each of the free ends of the inner tubes. A locking line 18 is threaded through the notches into the channels formed by the alignment of each of the inner and outer grooves.

Figure 8:
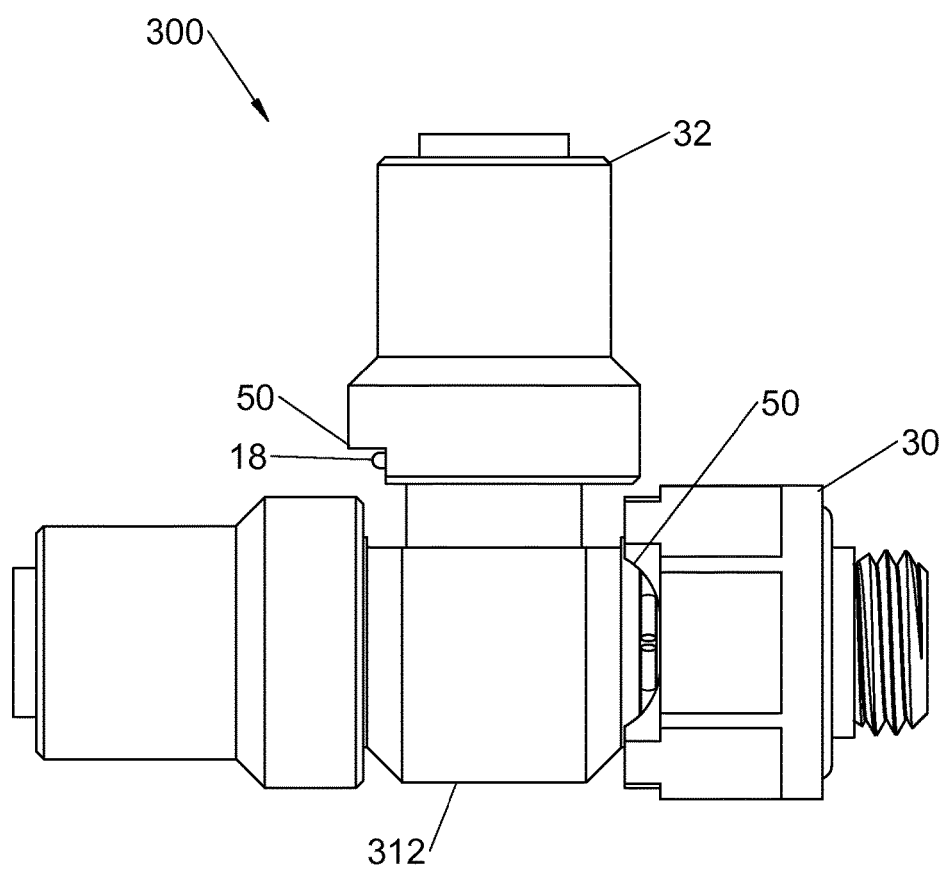
FIG. 8 is a side view of an alternate embodiment of a Detachable Tube Coupling System constructed in accordance with the principles of the present invention having a base fitting configured as a tee fitting.

In reference to FIG. 8, an alternate embodiment 300 is shown which includes abase fitting 312 configured as a tee connector. The base fitting 312 having three free ends, each end forming an inner tube in a cylindrical configuration with annular grooves 22 formed in the exterior surface of each of the inner tubes a fixed axial length from the free ends 24. Three modular couplers are shown each having a free end having at least one end forming an outer tube with an exterior in a cylindrical configuration, and an interior surface in a cylindrical configuration. A groove is formed in the interior surface of each coupler having an annular semi-rectangular configuration and located adjacent to the free end of the outer tube. An exterior notch 50 is formed in the outer tube of each of the couplers in communication with the interior groove of each of the free ends of the inner tubes. A locking line 18 is threaded through the notches into the channels formed by the alignment of each of the inner and outer grooves.

It is intended that additional embodiments may include a plurality of base fittings of different shapes with additional free ends configured to connect to additional couplers. It is also intended that additional embodiments may include a plurality of couplers, including tube fittings and pipe fittings, each configured to connect to the free ends of the base fittings. As is commonly known with these types of fitting and couplers, the "male" and "female" parts of the system may be interchangeably configured, resulting in additional embodiments of the base fittings and couplers.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A detachable tube coupling system, the system comprising, in combination:

a locking line, the locking line having two free ends, a central extent and two intermediate extents, the intermediate extents being between the central extent and the two free ends, the locking line being fabricated of an inextensible, flexible material taken from a class of flexible, inextensible materials including plastic, metal and composite, the locking line having a fixed outer diameter along its entire length;

a base fitting formed with at least one end forming an inner tube 44 having an exterior surface with a cylindrical configuration, the inner tube having an interior surface with a cylindrical configuration, the inner tube having a free inner end, an interior groove having an annular semi-cylindrical configuration formed in the exterior surface of the inner tube, the interior groove being located at a fixed axial length from the free end of the inner tube;

a modular coupler having at least one end forming an outer tube having an exterior surface with a cylindrical configuration, the outer tube having an interior surface with a cylindrical configuration, the outer tube having a free outer end, an exterior groove having an annular semi-cylindrical configuration formed in the interior surface of the outer tube, the exterior groove being located adjacent to the free end of the outer tube; and an exterior notch formed in the outer tube in communication with the interior groove, the inner tube and the outer tube being axially positioned with the interior groove and exterior groove forming a channel, the channel having a diameter essentially equal to the diameter of the locking line, the locking line being in a locked orientation positioned with the free ends exterior of the system for handling, and with the central extent within the cylindrical exterior groove to abate axial movement between the inner and outer tubes, and with the intermediate extents within the exterior notch, the locking line adapted to be pulled from the cylindrical groove through the outer notch to an unlocked orientation thereby facilitating separation of the inner and outer tubes.

2. The detachable tube coupling system of claim 1 in which the outer tube is formed with an annular abutment shoulder projecting radially inwardly from the interior surface of the outer tube, the annular abutment shoulder being located at the fixed axial length from the free inner end of the inner tube, the inner tube being located co-axially within the outer tube with the annular abutment shoulder of the outer tube in close proximity to the free inner end of the inner tube.

3. The detachable tube coupling system of claim 2 further including a second exterior groove having an annular semi-cylindrical configuration formed in the interior surface of the outer tube adjacent to the annular abutment shoulder; and an O-ring positioned in the second exterior groove and the exterior surface of the inner tube, the O-ring being fabricated of an elastomeric material to form a fluidic seal.

4. The detachable tube coupling system of claim 1 in which the locking line is formed with a cylindrical cross section.

5. The detachable tube coupling system of claim 1 in which the free inner end of the base fitting is chamfered.

6. The detachable tube coupling system of claim 1 in which the exterior cylindrical surface of the modular coupler is further defined as having hexagonal surface for receiving a wrench.

7. The detachable tube coupling system of claim 1 in which the base fitting is a straight fitting.

8. The detachable tube coupling system of claim 1 in which the base fitting is an elbow fitting.

9. The detachable tube coupling system of claim 1 in which the base fitting is a tee fitting.

10. The detachable tube coupling system of claim 1 in which the modular coupler has a second end formed as a threaded fitting.

11. The detachable tube coupling system of claim 1 in which the modular coupler has a second end formed as a tube fitting.

12. A detachable tube coupling system, the system comprising, in combination:
- a locking line, the locking line having two free ends, a central extent and two intermediate extents, the intermediate extents being between the central extent and the two free ends, the locking line being fabricated of an inextensible, flexible, plastic or metal material with a cylindrical cross sectional configuration, the locking line having a fixed diameter along its entire length;
- a base fitting formed with at least one end forming an inner tube having a free end, the inner tube having an exterior surface with a cylindrical configuration, the inner tube having an interior surface with a cylindrical configuration, the inner tube having a free inner end, an interior groove having an annular semi-cylindrical configuration formed in the exterior surface of the inner tube, the interior groove being located at a fixed axial length from the free end of the inner tube, the free end having a chamfered surface;
- at least one modular coupler having at least one end forming an outer tube having an exterior surface with a cylindrical configuration, the outer tube having an interior surface with a cylindrical configuration, the outer tube having a free outer end, an exterior groove having an annular semi-cylindrical configuration formed in the interior surface of the outer tube, the exterior groove being located adjacent to the free end of the outer tube, an annular abutment shoulder projecting radially inwardly from the interior surface of the outer tube, the outer tube having a second exterior groove having an annular semi-cylindrical configuration formed in the interior surface adjacent to the annular abutment, the annular abutment shoulder being located at the fixed axial length from the free inner end of the inner tube, the inner tube being located co-axially within the outer tube with the annular abutment shoulder of the outer tube in close proximity to the free inner end of the inner tube;
- an O-ring positioned in the second exterior groove and the exterior surface of the inner tube, the O-ring being fabricated of an elastomeric material to form a fluidic seal; and
- an exterior notch formed in the outer tube in communication with the interior groove, the exterior notch extending circumferentially for up to 100 degrees at the interior surface of the outer tube, the exterior notch extending circumferentially for up to 120 degrees at the exterior surface of the outer tube; the inner tube and the outer tube being axially positioned with the interior groove and exterior groove forming a channel, the channel having a diameter essentially equal to the diameter of the locking line, the locking line being in a locked orientation positioned with the free ends exterior of the system for handling, and with the central extent within the cylindrical groove to abate axial movement between the inner and outer tubes, and with the intermediate extents within the exterior notch, the locking line adapted to be pulled from the channel through the exterior notch to an unlocked orientation thereby facilitating separation of the inner and outer tubes.

\* \* \* \* \*